US011189113B2

(12) United States Patent
Jeong et al.

(10) Patent No.: US 11,189,113 B2
(45) Date of Patent: Nov. 30, 2021

(54) FORWARD COLLISION AVOIDANCE ASSIST PERFORMANCE INSPECTION SYSTEM AND METHOD THEREOF

(71) Applicants: HYUNDAI MOTOR COMPANY, Seoul (KR); KIA MOTORS CORPORATION, Seoul (KR)

(72) Inventors: Jae Cheol Jeong, Siheung-si (KR); TaeJong Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 399 days.

(21) Appl. No.: 16/418,085

(22) Filed: May 21, 2019

(65) Prior Publication Data
US 2020/0160627 A1  May 21, 2020

(30) Foreign Application Priority Data
Nov. 19, 2018  (KR) .................. 10-2018-0142900

(51) Int. Cl.
G07C 5/08 (2006.01)
G07C 5/00 (2006.01)
B60W 30/09 (2012.01)
B60T 7/22 (2006.01)
H04L 12/40 (2006.01)

(52) U.S. Cl.
CPC .............. *G07C 5/0808* (2013.01); *B60T 7/22* (2013.01); *B60W 30/09* (2013.01); *G07C 5/008* (2013.01); *H04L 12/40* (2013.01); *H04L 2012/40215* (2013.01); *H04L 2012/40273* (2013.01)

(58) Field of Classification Search
CPC ......... G07C 5/008; G07C 5/0808; B60T 7/22; B60W 30/09; H04L 12/40; H04L 2012/40215–40273
See application file for complete search history.

(56) References Cited

U.S. PATENT DOCUMENTS 9,520,006 B1\* 12/2016 Sankovsky ............ G06Q 10/20
10,169,999 B2\* 1/2019 Pandurangarao ...........................
                                            G08G 1/096775
2016/0125669 A1\* 5/2016 Meyer ...................... G07C 5/12
                                            701/31.5

(Continued)

*Primary Examiner* — Calvin Cheung
(74) *Attorney, Agent, or Firm* — McDonnell Boehnen Hulbert & Berghoff LLP

(57) ABSTRACT

A forward collision avoidance assist performance inspection system, and a method is provided. A system for inspecting Forward Collision Avoidance Assist (FCA) performance includes: an OBD, which is connected with the vehicle through Controller Area Network (CAN) communication and receives driving information according to an operation; and an inspection terminal, which is mounted on the vehicle, is connected with the OBD through short range wireless communication, measures vehicle location information on a road map by utilizing a differential Global Positioning System (GPS) during a driving test, determines whether an FCA function is operated when the vehicle passes a normal braking gate spaced apart from an obstacle set on the road map in a predetermined distance, and applies forced brake control information through the OBD and stops the vehicle when the vehicle passes a forced braking gate when the FCA function of the vehicle is not operated.

20 Claims, 6 Drawing Sheets

(56) References Cited

U.S. PATENT DOCUMENTS

| | | | | |
|---|---|---|---|---|
| 2017/0101093 A1* | 4/2017 | Barfield, Jr. | ..... | G08G 1/096775 |
| 2017/0200325 A1* | 7/2017 | Kumar | ................. | G07C 5/085 |
| 2017/0345227 A1* | 11/2017 | Allen, Jr. | ............... | G07C 5/008 |
| 2018/0151003 A1* | 5/2018 | Grobler | ............... | G06F 11/2294 |
| 2019/0025856 A1* | 1/2019 | Turato | ................. | H04L 9/3234 |

* cited by examiner

FORWARD COLLISION AVOIDANCE ASSIST PERFORMANCE INSPECTION SYSTEM AND METHOD THEREOF

CROSS-REFERENCE TO RELATED APPLICATION

The present application claims priority to and the benefit of Korean Patent Application No. 10-2018-0142900 filed in the Korean Intellectual Property Office on Nov. 19, 2018, which is incorporated herein by reference in its entirety.

FIELD

The present disclosure relates to a forward collision avoidance assist performance inspection system, and a method thereof, and more particularly, a system for inspecting forward collision avoidance assist performance while a vehicle, to which a forward collision avoidance assist function is applied, is travelling in a driving test place, and a method thereof.

BACKGROUND

The statements in this section merely provide background information related to the present disclosure and may not constitute prior art.

In general, a driver confronts many unexpected dangerous situations due to drowsy driving of a driver, poor driving, reckless driving, a road condition, and the like.

Because of this, Advanced Driver Assistance Systems (ADAS), which assist driving safety by enabling a vehicle to determine a part of a dangerous situation generated during driving by itself, have been developed.

For example, in the ADAS technology, Land Following Assist (LFA), Lane Keeping Assist (LKA), and Forward Collision-Avoidance Assist (FCA) applied even to an autonomous vehicle are functions for helping a driver to more safely drive a vehicle.

Among them, the FCA is a driving safety system for warning a driver of a danger and controlling a brake of a vehicle in order to avoid a collision with a forward obstacle during travelling.

In the meantime, in an existing vehicle factory, in order to inspect whether the FCA function applied to a vehicle is properly operated, a subjective (artificial) inspection utilizing sense of sight and auditory sense of operators are performed.

However, the existing subjective inspection method depends on only a determination of an operator, so that an error may be generated, which causes a problem in a field claim and deterioration of a quality of a vehicle maker.

In addition, an operator may determine only a result of the determination whether the FCA function is operated, so that it fails to provide objective inspection data, based on which it is possible to determine whether the FCA function is normally operated at an operation time point designed for each function, thereby causing a problem in that inspection reliability is degraded.

SUMMARY

The present disclosure provides a forward collision avoidance assist performance inspection system, in which an inspection terminal including a differential Global Positioning System (GPS) is mounted to a vehicle and an operation state of a Forward Collision Assist (FCA) function according to location information about a vehicle on a road is quantitatively inspected during a driving test, and a method thereof.

The present disclosure also provides a forward collision avoidance assist performance inspection system, which accumulates inspection data collected from an inspection terminal in an inspection process of FCA and performs trace analysis when a problem is generated in a vehicle, and a method thereof. An exemplary form of the present disclosure provides a system for inspecting Forward Collision Avoidance Assist (FCA) performance, which inspects an FCA function of a vehicle during travelling, the system including: an OBD, which is connected with the vehicle through Controller Area Network (CAN) communication and receives driving information according to an operation; and an inspection terminal, which is mounted on the vehicle, is connected with the OBD through short range wireless communication, measures vehicle location information on a road map by utilizing a differential Global Positioning System (GPS) during a driving test, determines whether an FCA function is operated at a time point, at which the vehicle passes a normal braking gate G1 spaced apart from a front obstacle set on the road map by a predetermined distance, and applies forced brake control information through the OBD and stops the vehicle when the vehicle passes a forced braking gate G2 in the state where the FCA function of the vehicle is not operated.

The system may further include a server, which controls an operation state of a driving test place, identifies the vehicle through the OBD, collects FCA inspection data of the vehicle from the inspection terminal through wireless communication, and makes the collected FCA inspection data in the form of a DataBase (DB).

The OBD may match a Vehicle Identification Number (VIN), a dimension, and specification information of the vehicle with an OBD ID of the OBD and share the matched VIN, dimension, and specification information with an inspection terminal and the server.

The inspection terminal may measure a time point, at which the vehicle being driving tested passes a virtual inspection start gate SG set on the road map, a time point, at which the vehicle passes the normal braking gate G1 spaced apart from the obstacle by a first distance, and a time point, at which the vehicle passes the forced braking gate G2 spaced apart from the obstacle by a second distance, through the differential GPS.

The normal braking gate G1 may be a brake operation point according to a generation of an obstacle detection signal of a forward collision danger and the operation of the FCA function, and may be set with a section maximally extended before an entry of the forced braking gate G2 in a longitudinal direction of a road.

The inspection terminal may include: a differential GPS module, which corrects a GPS error of a satellite with reference to a fixed GPS signal of at least one fixed GPS measuring device and measures the vehicle location information with high preciseness; a CAN communication module, which connects short range communication with the OBD and transceives data; a wireless communication module, which is connected with a server through wireless communication and transmits inspection data collected according to an FCA inspection of the vehicle to the server; a power supply module, which supplies power of a battery or supply power through a connection of a socket of the vehicle; a storage module, which stores various programs and data for the FCA inspection, and stores inspection data collected according to the FCA inspection based on a vehicle, on which the inspection terminal is mounted; and a control module, which performs the FCA inspection while the vehicle travels and determines an inspection result according to whether the FCA function is normally operated, collects the inspection data according to the determination of the inspection data through the OBD, and records the collected inspection data in the storage module.

The inspection data may include operation information, an operation state, and log data of the vehicle recorded from the FCA inspection start time point to an FCA inspection end time point in time series.

The control module may generate a vehicle having a size of a plane in consideration of a movement direction and a dimension of the vehicle based on differential GPS coordinates of the inspection terminal, and augment and display the generated vehicle on the road map on the same scale.

When the vehicle location information passes the inspection start gate SG during the travelling of the vehicle, the control module may start the FCA inspection and collect the driving information, and when the vehicle location information passes the normal braking gate G1, the control module may analyze the driving information and determine whether the FCA function is normal or has a failure according to an operation of the FCA function.

When a reception of an obstacle detection signal and a brake operation signal according to the operation of the FCA function is confirmed through the driving information, the control module may determine that the FCA function is normal, and when any one of the signals is not received, the control module may determine that the FCA function has a failure.

The control module may discriminate a brake operation signal according to the operation of the FCA function and a brake pedal operation signal, and when the brake pedal operation signal is received in the driving information, the control module may determine that braking is generated by cheating of a driver of a test.

The control module may further recognize whether an FCA warning signal is received in the driving operation, and determine whether an FCA function operation warning is normally visually and audibly displayed to a driver.

The control module may match a determination result of the FCA inspection and inspection data according to the determination result to a VIN number of the vehicle and records the matched data, and transmit the recorded inspection data to the server through wireless communication.

Another form of the present disclosure provides a method of inspecting Forward Collision Avoidance Assist (FCA) performance of an inspection terminal, which is mounted on a vehicle and inspects an FCA function of a vehicle during a road driving test, the method including: a) when power is on, connecting short range wireless communication with an OBD mounted on a vehicle and measuring vehicle location information on a road map by using a differential Global Positioning System (GPS) module; b) when the vehicle passes a virtual inspection start gate SG set on a road, determining that the vehicle enters an inspection section and collecting driving information form the OBD; c) determining whether an FCA function is operated at a time point, at which the vehicle passes a normal braking gate G1 spaced apart from a front obstacle set on the road map by a predetermined distance; and d) applying forced brake control information through the OBD and stopping the vehicle when the vehicle passes a forced braking gate G2 in the state where the FCA function of the vehicle is not operated.

Operation a) may include generating a vehicle having a size of a plane in consideration of a movement direction and a dimension of the vehicle based on differential GPS coordinates of the inspection terminal held at a center of a dashboard, and augmenting and displaying the generated vehicle on the road map on the same scale.

Operation c) may include: analyzing the driving operation received at a time point, at which the vehicle passes the normal braking gate G1, and checking whether an obstacle detection signal is received; and when the obstacle detection signal is not received, determining that an obstacle detection function has an error.

Operation c) may include: analyzing the driving operation received at a time point, at which the vehicle passes the normal braking gate G1, and checking whether an obstacle detection signal is received; and when a brake operation signal according to an operation of the FCA function is not received, determining that a brake operation signal of the FCA function has a failure.

Operation c) may further include recognizing whether an FCA warning signal is received in a state where the brake operation signal according to the operation of the FCA function is received, and determining whether an FCA function operation warning is normally visually and audibly displayed to a driver.

Operation d) may include generating forced brake control information including a forced brake operation signal, a warning signal, and an emergency light operation signal according to a determination that an obstacle detection signal has a failure or a brake operation signal has a failure.

The method may further include, after operation d), e) matching inspection data, in which an FCA inspection failure reason of the obstacle detection signal failure or the brake operation signal failure is recorded, to a Vehicle Identification Number (VIN) of the vehicle and recording the matched inspection data, and transmitting the recorded data to a server through wireless communication.

In some forms of the present disclosure, the driving inspection terminal using the differential GPS is mounted on a vehicle and an FCA inspection is performed through the driving inspection terminal during the driving, so that there is an effect in that it is possible to solve an existing human error problem depending on a determination of an operator and improve reliability of the FCA inspection.

Further, a vehicle, of which FCA performance is verified through an actual road driving test, is provided, so that there is an effect in that it is possible to decrease a field claim problem and improve customer satisfaction according to the improvement of reliability of a product.

Further, an inspection history collected in a driving inspection terminal is recorded during an FCA inspection process of a vehicle, so that there is an effect in that it is possible to trace and analyze various problems generated in the inspection process and utilize the traced and analyzed various problems in the research and the improvement of the FCA technology in the future.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
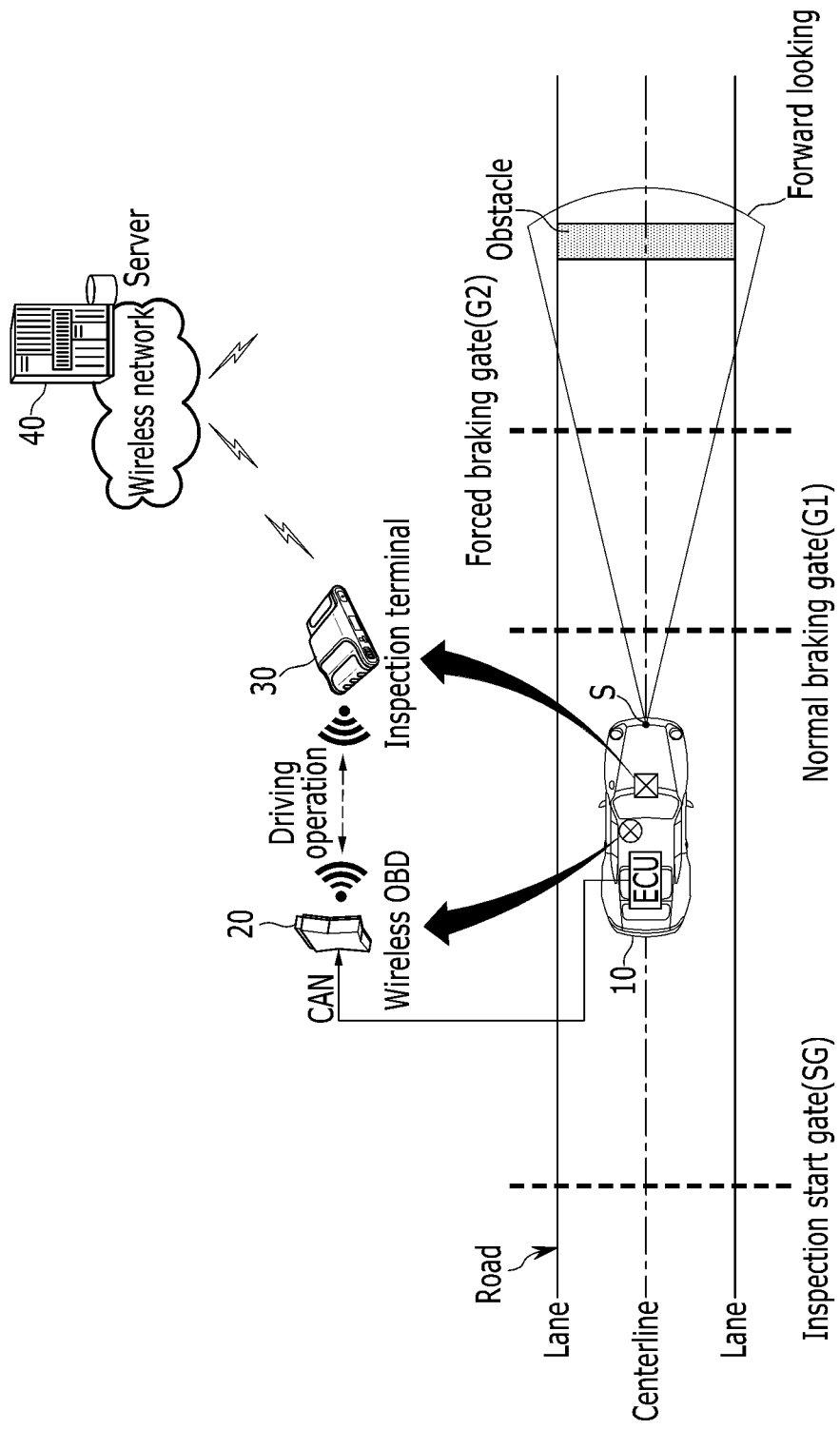
FIG. 1 is a network diagram illustrating a forward collision avoidance assist performance inspection system in one form of the present disclosure.

The drawings described herein are for illustration purposes only and are not intended to limit the scope of the present disclosure in any way.

<Description of symbols>

| | | | |
|---|---|---|---|
| 10: | Vehicle | 11: | Driving information detecting unit |
| 12: | Interface unit | 13: | Electronic Control unit (ECU) |
| 20: | OBD | 30: | Inspection terminal |
| 31: | Differential GPS module | 32: | CAN communication module |
| 33: | Wireless communication module | 34: | Power supply module |
| 35: | Storage module | 36: | Control module |
| SG: | Inspection start gate | G1: | Normal braking gate |
| G2: | Forced braking gate | | |

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Further, in the present specification, it should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Hereinafter, a forward collision avoidance assist performance inspection system in some forms of the present disclosure and a method thereof will be described in detail with reference to the drawings.

FIG. 1 is a network diagram illustrating a forward collision avoidance assist performance inspection system in some forms of the present disclosure.

Referring to FIG. 1, the forward collision avoidance assist performance inspection system (hereinafter, referred to as an "FCA inspection system") in some forms of the present disclosure includes a vehicle 10, an OBD 20, an inspection terminal 30, and a server 40.

A driving safety assist function of FCA is applied to the vehicle 10 and the vehicle 10 is deployed to a road driving test of a driving test place.

The vehicle 10 is assembled in a production line of a factory, is completely inspected, and then is transferred to a final driving test place. That is, the vehicle 10 is a completed vehicle, in which operation performance of a forward detection sensor including converged camera and radar and a brake for implementing the FCA function is investigated.

The OBD 20 is mounted to monitor assembling and inspection states of the vehicle 10 in the production line, and serves to relay Controller Area Network (CAN) communication (also referred to as "diagnosis communication") between the vehicle 10 and the inspection terminal 30.

The OBD 20 collects data generated according to the FCA function inspection of the vehicle 10, and transmits the generated data to the inspection terminal 30 through short range wireless communication.

The OBD 20 is mounted to the vehicle 10 in the production line of the factory, and receives a vehicle identification number (driving information), a dimension, specification information, and the like, matches the received data with an ID of the OBD 20, and shares the matching result with the external inspection terminal 30 and the server 40. Then, the OBD 20 transmits the data collected from the vehicle 10 through the OBD ID when transmitting the collected data to the outside. Accordingly, the external device may manage a movement and a process state of the vehicle 10 matched to the OBD ID.

The inspection terminal 30 is mounted on a dashboard of the driving test vehicle 10, and is connected with the OBD 20 through short range wireless communication. The short range wireless communication may be connected through a wireless Local Area Network (LAN) (WiFi) or Bluetooth.

The inspection terminal 30 recognizes vehicle location information on a road by using a differential Global Positioning System (GPS) during travelling, and performs a quantitative inspection about whether a brake is normally operated in an operation condition of the FCA function. Herein, the differential GPS removes several accompanying error factors of an existing GPS and has high preciseness of several cm (for example, 2 cm) or less.

The inspection terminal 30 stores a road map of the driving test place, and measures a time point, at which the vehicle 10 being driven tested passes an inspection start gate SG through the differential GPS.

Further, the inspection terminal 30 may measure a time point, at which the vehicle 10 passes a normal braking gate G1 separated from a front obstacle by a first distance, and a time point, at which the vehicle 10 passes a forced braking gate G2 separated from the front obstacle by a second distance.

The inspection start gate SG, the normal braking gate G1, and the forced braking gate G2 are virtual gateways set in a width direction of a road on the road map, and are set in order away from the obstacle as illustrated in FIG. 1 (SG>G1>G2).

Herein, the inspection start gate SG means an inspection start point, at which the FCA inspection of the inspection terminal 30 is initiated when the vehicle 10 according to the location information of a differential GPS module 31 passes the inspection start gate SG.

The normal braking gate G1 means a point, at which an obstacle detection signal of forward collision danger is generated and a brake is normally operated according to the generation of the obstacle detection signal. Herein, the normal braking gate G1 is indicated by one line, but is not limited thereto, and may be set with a section extended in a longitudinal direction of a road. For example, the normal braking gate G1 may be set as a normal brake operating point in a section from an entry time point of the normal braking gate G1 maximally to an entry point of the forced braking gate G2.

The forced braking gate G2 means a forced braking point, at which the inspection terminal 30 applies forced brake control information to the vehicle 10 when the brake is not operated at the brake operating time point.

The server 40 is a system controlling an operation state of the driving test place, and is mounted with at least one computers, DBs, and wireless communication means.

The server 40 identifies the vehicle 10 through the wireless OBD 20, collects inspection data according to the result of the FCA inspection of the vehicle 10 through wireless communication with the inspection terminal 30 and accumulates and stores the collected inspection data, and makes the stored inspection data in the form of a database as a vehicle-specific inspection history.

Figure 2:
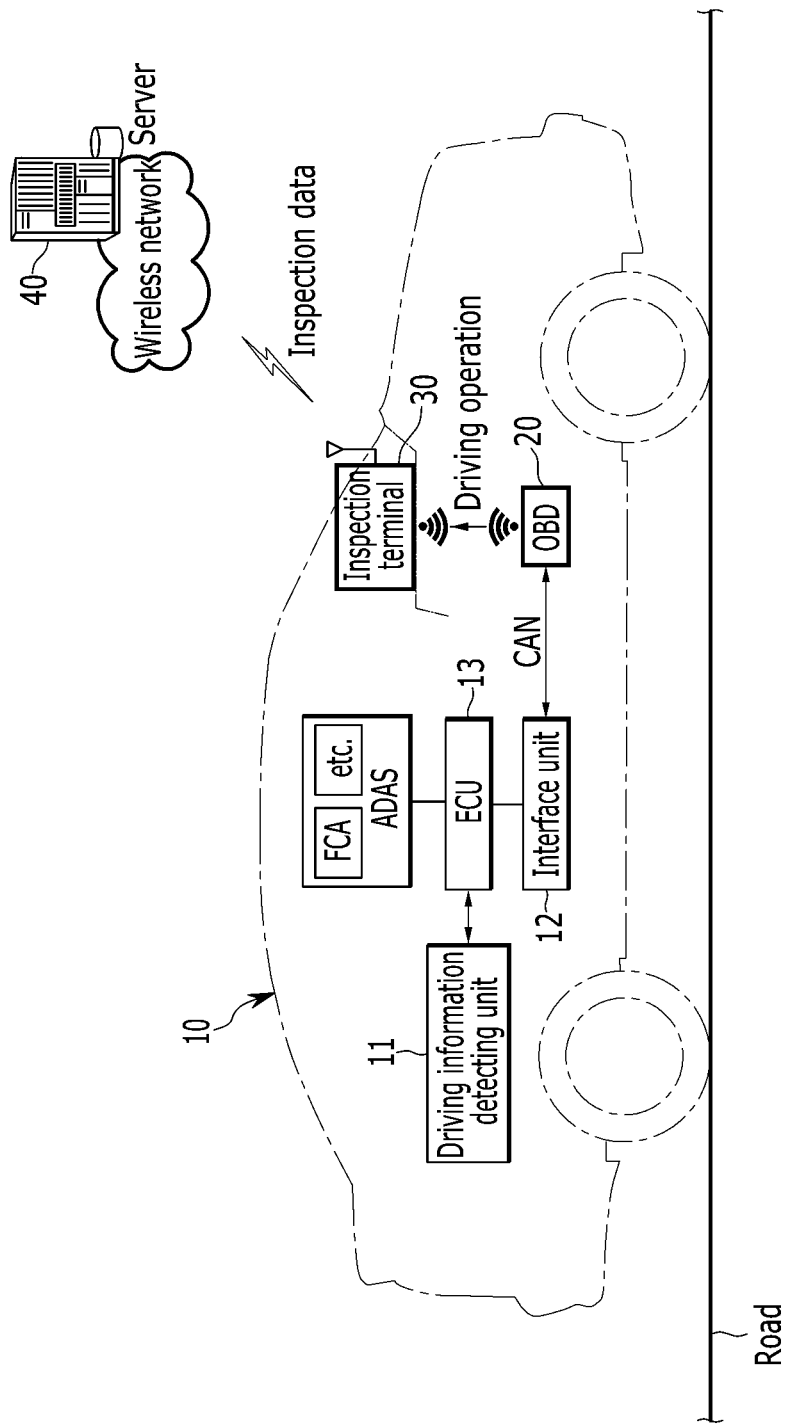
FIG. 2 is a diagram illustrating a connection structure of an internal configuration of a vehicle, an OBD, and an inspection terminal in one form of the present disclosure.

In the meantime, FIG. 2 is a diagram illustrating a connection structure of an internal configuration of the vehicle, the OBD, and the inspection terminal in some forms of the present disclosure.

Figure 3:
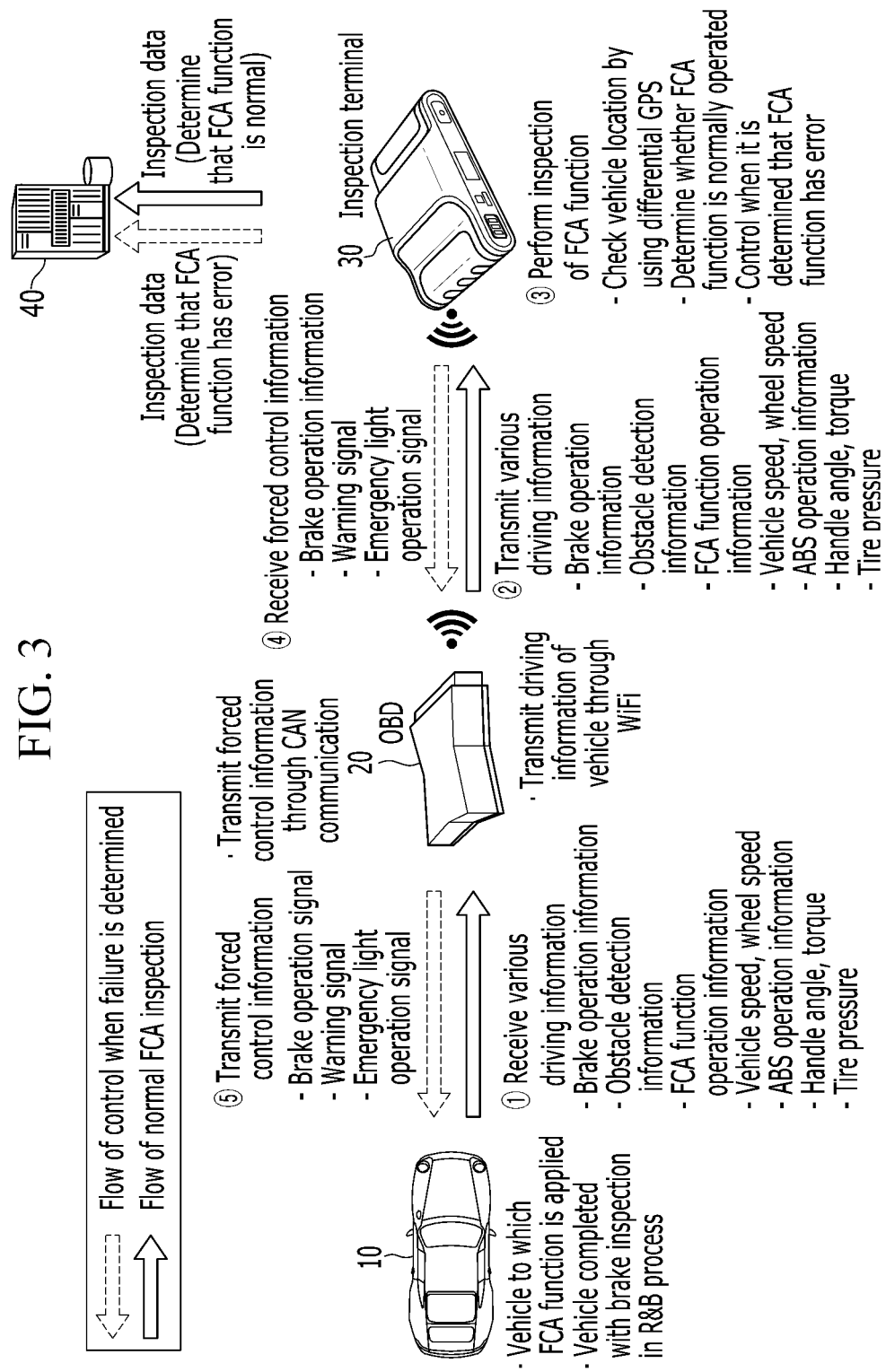
FIG. 3 is a diagram illustrating a flow of data transmission in a Forward Collision Assist (FCA) inspection process in one form of the present disclosure.

Further, FIG. 3 is a diagram illustrating a flow of data transmission in the FCA inspection process in some forms of the present disclosure.

First, referring to FIG. 2, the vehicle 10 adopts Advanced Driver Assistance Systems (ADAS), to which the FCA function is applied, and includes a driving information detecting unit 11, an interface unit 12, and an Electronic Control unit (ECU) 13.

The driving information detecting unit 11 collects driving information from various sensors and the ECU according to an operation of the vehicle 10. For example, the driving information detecting unit 11 may detect driving information, such as brake operation information, obstacle detection information, FCA function operation information, a vehicle speed, a wheel speed, Anti-lock Brake System (ABS) operation information, a steering wheel angle, a steering wheel torque, and tire pressure.

The interface unit 12 connects CAN communication with the OBD 20 connected to a connection terminal.

Herein, a data transmission flow between the interface unit 12 of the vehicle 10, the OBD 20, and the inspection terminal 30 during the FCA inspection process will be described below with reference to FIG. 3.

The interface unit 12 of the vehicle 10 transmits the driving information detected by the driving information detecting unit 11 during the FCA inspection to the OBD 20 connected through the CAN communication.

The OBD 20 transmits the driving information received from the interface unit 12 of the vehicle 10 to the inspection terminal 30 through the short range wireless communication.

The inspection terminal 30 performs the FCA function inspection of the vehicle 10 and checks vehicle location information by using the differential GPS during the travelling, and determines a result of the inspection of whether the FCA function is operated at a time point at which the vehicle passes the normal braking gate G1 with reference to the driving information.

When the FCA function is not operated at the time point at which the vehicle passes the normal braking gate G1, the inspection terminal 30 generates forced brake control information according to the determination that the FCA function has an error and transmits the generated forced brake control information to the OBD 20. The forced brake control information includes a forced brake operation signal, a warning signal, an emergency light operation signal.

The OBD 20 transmits the forced brake control information received from the inspection terminal 30 to the interface unit 12 of the vehicle 10 through the CAN communication.

In the meantime, the ECU 13 controls a general operation of the FCA applied to the ADAS for assisting the driving safety, and to this end, the ECU 13 may be linked with various control units within the vehicle. For example, the ECU 13 is a superordinate control unit, and may control subordinate control units, such as a brake control unit, an ABS, an Engine Management System (EMS), a Telecommunication Control Unit (TCU), an Audio Video Navigation (AVN) system, a cluster control unit, and an emergency light control unit within the vehicle.

When the forced brake control information is received from the inspection terminal 30, the ECU 13 displays a warning signal according to the determination that the FCA function has the error, and forcibly operates the brake and operates the emergency light. Further, according to the reception of the forced brake control information, the ECU 13 may make a response by transmitting driving information indicating that the forced operation is completed to the inspection terminal 30 through the OBD 20.

Figure 4:
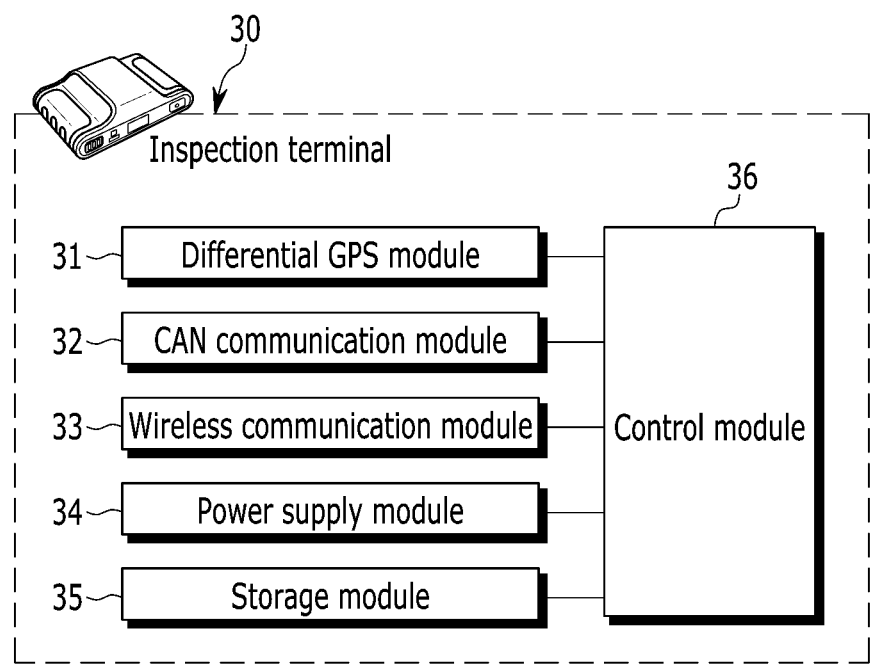
FIG. 4 is a block diagram schematically illustrating a configuration of the inspection terminal in one form of the present disclosure.

In the meantime, FIG. 4 is a block diagram schematically illustrating a configuration of the inspection terminal in some forms of the present disclosure.

Referring to FIG. 4, the inspection terminal 30 in some forms of the present disclosure includes the differential GPS module 31, a CAN communication module 32, a wireless communication module 33, a power supply module 34, a storage module 35, and a control module 36.

The differential GPS module 31 measures vehicle location information of high preciseness by removing an error factor of a satellite.

The differential GPS module 31 corrects a GPS signal thereof with reference to a fixed GPS signal of at least one fixed GPS measuring device (not illustrated) and measures a differential GPS signal. The differential GPS module 31 may correct the GPS signal thereof detected for each setting time by using the fixed GPS signal received for each setting time. The fixed GPS measuring device is disposed within the test place and supports the high precise correction of the GPS signal of the differential GPS module 31 at a close location.

The CAN communication module 32 transceives the ID with the OBD 20 to connect short range wireless communication, and transceives CAN data with the vehicle 10 through the OBD 20.

The CAN communication module 32 may receive driving information according to the operation of the vehicle during the FCA inspection from the OBD 20. In contrast, the CAN communication module 32 may transmit the forced brake control information according to the determination that the FCA function of the vehicle 10 has the error to the OBD 20.

The wireless communication module 33 connects wireless communication with the server 40, and transmits inspection data collected according to the FCA inspection during the travelling of the vehicle 10. The inspection data may include operation information, an operation state, and log data of the vehicle 10 recorded from the FCA inspection start time point to the FCA inspection end time point in time series.

The wireless communication module 33 may transmit information indicating whether the inspection is successful based on each vehicle mounted with the wireless communication module 33 and inspection data by using an ID of the OBD mounted to a corresponding vehicle. Accordingly, the server 40 may accumulate and store the inspection data of the vehicle matched to the OBD ID in a DB.

The power supply module 34 supplies power to each module for the operation of the inspection terminal 30. The power supply module 34 may supply power through a connection of a socket with the vehicle or supply power of a battery.

The storage module 35 stores various program and data for the FCA inspection of the vehicle 10, and stores inspection data collected according to the vehicle-specific FCA inspection.

Further, the storage module 35 stores road map coordinates (x, y) of the driving test place, and stores coordinates of the inspection start gate SG, the normal braking gate G1, and the forced braking gate G2 which are the virtual gateways set in the width direction of the road of the road map.

The control module 36 controls a general operation for the FCA inspection of the vehicle 10, on which the inspection terminal 30 in some forms of the present disclosure is mounted.

The control module 36 determines whether the FCA function is normally operated at an obstacle collision detection time point by performing the inspection of the FCA function during the travelling of the vehicle 10, collects inspection data according to a result of the determination, and records the collected inspection data in the storage module 35.

When the control module 36 is supplied with power (on), the control module 36 connects short range communication with the OBD 20 and connects wireless communication with the server 40.

Further, the control module 36 measures vehicle location information through the differential GPS module 31 in real time.

In this case, the control module 36 augments the virtual vehicle 10 generated in consideration of a movement direction in the location information of the vehicle generated based on the differential GPS coordinates of the inspection terminal 30 held at a center of the dashboard and a dimension of the vehicle on the road map on the same scale and displays the vehicle 10. That is, the virtual vehicle 10 corresponds to a size of a plane of an actual vehicle dimension, and a front-rear length and an area of a left-right width are determined according to the vehicle location information and the movement direction measured by the differential GPS module 31.

The control module 36 monitors virtual vehicle location information measured by using the differential GPS information, and detects time points at which the vehicle 10 passes the inspection start gate SG, the normal braking gate G1, and the forced braking gate G2 set on the road map. Hereinafter, the control module 36 is continuously described in the subsequent description, so that the virtual vehicle and the actual vehicle will be identically referred to as the vehicle 10.

Figure 5:
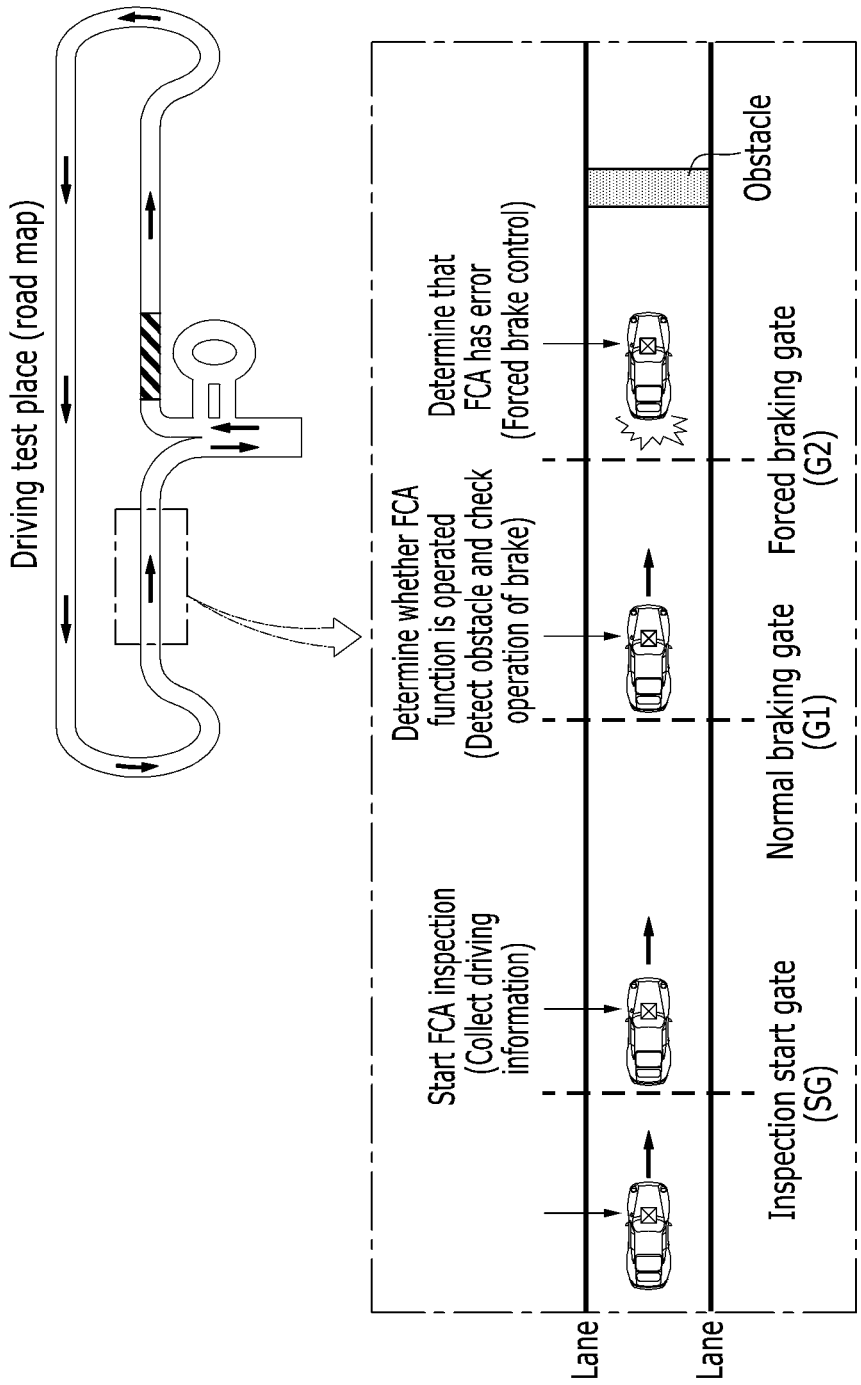
FIG. 5 is a diagram illustrating a process of determining, by a control module, whether an FCA function of a vehicle is operated in one form of the present disclosure.

FIG. 5 is a diagram illustrating a process of determining, by the control module, whether the FCA function of the vehicle is operated in some forms of the present disclosure.

Referring to FIG. 5, the control module 36 starts an FCA inspection when the travelling vehicle 10 passes the inspection start gate SG and collects driving information about the vehicle 10.

When the vehicle 10 passes the normal braking gate G1, the control module 36 analyzes the received driving operation, and determines whether the FCA function is normal or has an error according to an operation of the FCA function. In this case, the control module 36 may determine whether an obstacle detection signal and a brake operation signal according to the operation of the FCA function are received through the driving information.

Herein, the brake operation signal according to the FCA operation is discriminated from a brake pedal operation signal by a manipulation of a driver of a test. Accordingly, the control module 36 may discriminate whether the braking in the normal braking gate G1 is generated by the brake operation signal according to a justified FCA operation or by cheating of the driver of the test.

When the vehicle 10 passes the forced braking gate G2 in the non-operation state of the FCA function, the control module 36 applies the forced brake control information and forcibly stops the vehicle 10. In this case, when the brake of the vehicle 10 is operated through the forced brake control of the control module 36 and the vehicle 10 is stopped, the control module 36 may reconfirm that the brake operation signal by the error of the non-operation of the FCA function, not the failure of the brake, is not normally generated.

Then, the control module 36 may match the result of the determination of the FCA inspection and inspection data according to the result of the determination to a VIN number of the corresponding vehicle and record the matched inspection data, and transmit the recorded inspection data to the server 40 through wireless communication.

In the meantime, an FCA inspection method in some forms of the present disclosure will be described based on the configuration of the FCA inspection system with reference to FIG. 6 below, and a main agent of the method is the inspection terminal 30.

Figure 6:
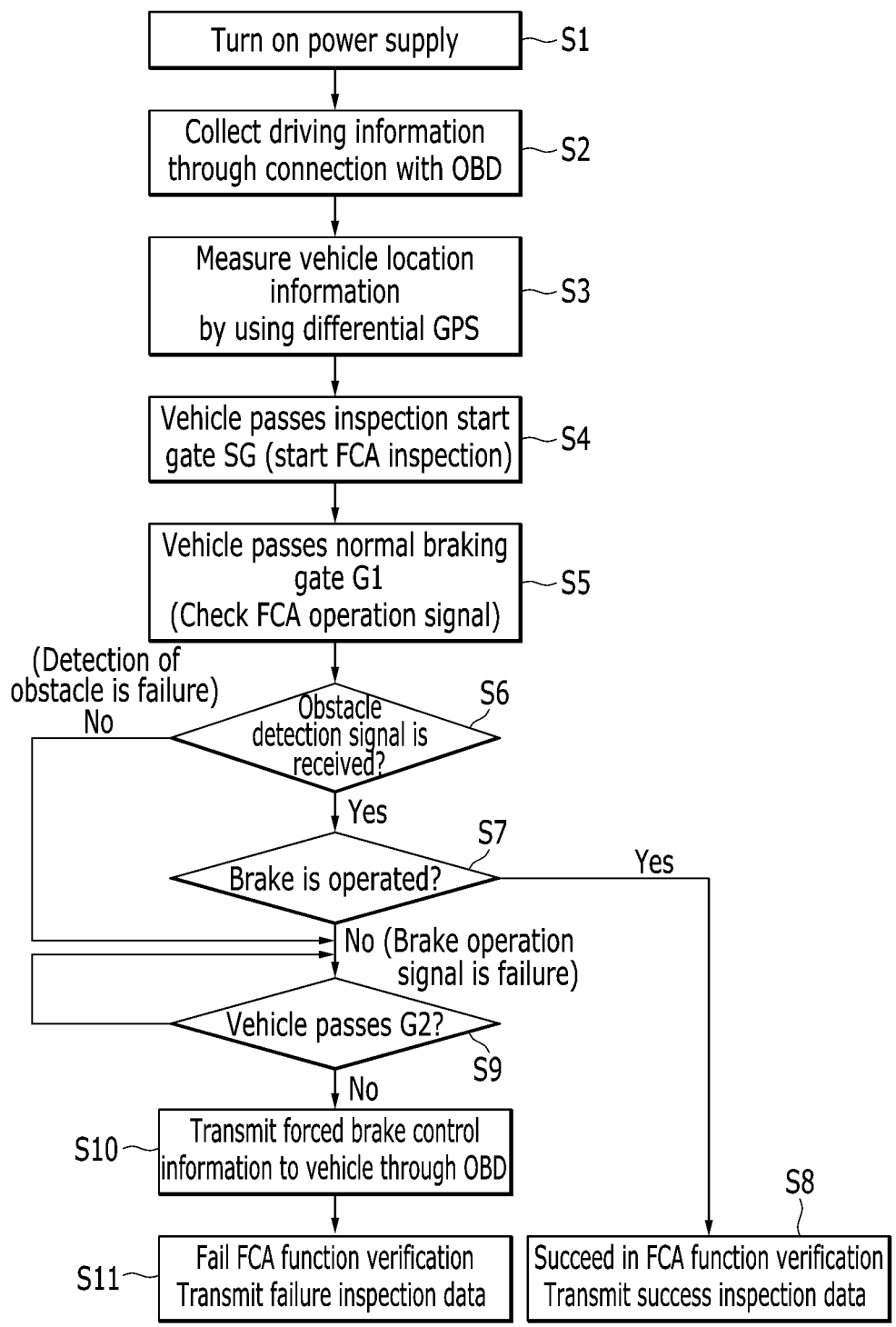
FIG. 6 is a flowchart schematically illustrating an FCA inspection method in one form of the present disclosure.

FIG. 6 is a flowchart schematically illustrating an FCA inspection method in some forms of the present disclosure.

Referring to FIG. 6, when the inspection terminal 30 is operated in the state where the inspection terminal 30 is held at a center of a dashboard of the vehicle 10 and a power supply is on (S1), the inspection terminal 30 collects driving information according to an operation of the vehicle 10 by connecting short range communication with the OBD 20 mounted within the vehicle (S2). In this case, the inspection terminal 30 may also connect wireless communication with the server 40 controlling a driving road test place.

The inspection terminal 30 measures vehicle location information by using the differential GPS module 31 (S3). In this case, the inspection terminal 30 may generate a virtual vehicle 10 corresponding to a size of a plane in consideration of a movement direction and a dimension of the vehicle based on differential GPS coordinates on a road map.

When the travelling vehicle 10 passes the virtual inspection start gate SG set on the road, the inspection terminal 30 determines that the vehicle 10 enters an inspection section and starts an FCA inspection (S4). The inspection terminal 30 records inspection data according to the collection of the driving information of the vehicle 10 from a time point, at which the vehicle 10 passes the inspection start gate, to the end of the inspection.

When the vehicle 10 passes the normal braking gate G1, the inspection terminal 30 analyzes the driving information received from the OBD 20 at a time point of the operation of the FCA function and checks whether an FCA operation signal is received (S5).

In this case, when a reception of an obstacle detection signal is checked (S6, YES), the inspection terminal 30 determines to succeed in normally detecting an obstacle.

Further, when a brake operation signal according to the operation of the FCA function is received (S7, YES), the inspection terminal 30 determines whether the brake operation signal according to the operation of the FCA function is normal. In this case, the inspection terminal 30 may further recognize whether an FCA warning signal is received, and determine whether an FCA function operation warning is normally visually (for example, a cluster or an AVN) and audibly (for example, a speaker) displayed to a driver.

Then, when the vehicle 10 is stopped by the operation of the brake according to the FCA, the inspection terminal 30 may determine that the vehicle 10 passes the FCA inspection and transmit the inspection data to the server 40 (S8).

However, when the obstacle detection signal is not received in operation S6 (S6, NO), the inspection terminal 30 determines that an obstacle detection function has an error.

When the vehicle 10 passes the forced braking gate G2 in the state where the brake is not operated due to a failure of the detection of the obstacle (S9, YES), the inspection terminal 30 transmits forced brake control information according to the determination that the FCA operation has an error to the OBD 20 and stops the vehicle 10 (S10).

Further, when the brake operation signal according to the operation of the FCA function is not received in operation S7 (S7, NO), the inspection terminal 30 determines that the brake operation signal of the FCA has a fault. Herein, in general, a vehicle having poor brake operation performance is generally sorted out in a verification process of a production factory and is not used in a driving test place. Accordingly, the inspection terminal 30 may determine the reason of the non-operation of the brake at the time point, at which the vehicle 10 passes the normal braking gate G1, as a failure of the transmission of the brake operation signal, not the failure of the operation of the brake.

When the vehicle 10 passes the forced braking gate G2 in the state where the brake is not operated due to a failure of the brake operation signal (S9, YES), the inspection terminal 30 transmits forced brake control information according to the determination that the FCA operation has an error to the OBD 20 and stops the vehicle 10 (S10).

Then, when the vehicle 10 stops, the inspection terminal 30 inspection data, in which at least one FCA inspection failure reason between the obstacle detection failure and the brake operation signal failure is recorded, to the server 40 (S11). In this case, the inspection terminal 30 may detect an FCA warning signal operation failure in the state where the detection of the obstacle and the brake operating signal are normal and transmit the detected FCA warning signal operation failure.

As described above, in some forms of the present disclosure, the driving inspection terminal using the differential GPS is mounted on the vehicle and the FCA inspection is performed through the driving inspection terminal during the travelling, so that there is an effect in that it is possible to solve an existing human error problem depending on a determination of an operator and improve reliability of the FCA inspection.

Further, a vehicle, of which FCA performance is verified through an actual road driving test, is provided, so that there is an effect in that it is possible to decrease a field claim problem and improve customer satisfaction according to the improvement of reliability of a product.

Further, an inspection history collected in a driving inspection terminal is recorded during an FCA inspection process of a vehicle, so that there is an effect in that it is possible to trace and analyze various problems generated in the inspection process and utilize the traced and analyzed various problems in the research and the improvement of the FCA technology in the future.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for inspecting Forward Collision Avoidance Assist (FCA) performance of a vehicle during travelling, the system comprising:
    an On-Board Diagnostics (OBD) connected with the vehicle through Controller Area Network (CAN) communication and configured to receive driving information corresponding to an operation; and
    an inspection terminal mounted on the vehicle and connected with the OBD through short range wireless communication, wherein the inspection terminal is configured to:
        measure vehicle location information on a road map by utilizing a differential Global Positioning System (GPS) during a driving test;
        determine whether an FCA function is operated when the vehicle passes a normal braking gate that is spaced apart from an obstacle set on the road map in a predetermined distance; and
        apply forced brake control information through the OBD and stop the vehicle when the vehicle passes a forced braking gate when the FCA function is not operated.

2. The system of claim 1, wherein the system further comprises:
    a server configured to:
        control an operation state of a driving test place;
        identify the vehicle through the OBD;
        collect FCA inspection data of the vehicle from the inspection terminal through wireless communication; and
        make the collected FCA inspection data as a DataBase (DB).

3. The system of claim 2, wherein the OBD is configured to:
    match a Vehicle Identification Number (VIN), a dimension, and specification information of the vehicle with an OBD Identifier (ID) of the OBD; and
    share the matched VIN, the matched dimension, and the matched specification information of the vehicle with the inspection terminal and the server.

4. The system of claim 1, wherein the inspection terminal is configured to:
    measure a first time point when the vehicle passes a virtual inspection start gate (SG) set on the road map;
    measure a second time point when the vehicle passes the normal braking gate that is spaced apart from the obstacle in a first distance; and
    measure a third time point when the vehicle passes the forced braking gate that is spaced apart from the obstacle in a second distance through the differential GPS.

5. The system of claim 1, wherein the normal braking gate is:
  a brake operation point according to a generation of an obstacle detection signal of a forward collision danger and the operation of the FCA function; and
  set with a section maximally extended before an entry of the forced braking gate in a longitudinal direction of a road.

6. The system of claim 1, wherein the inspection terminal further comprises:
  a differential GPS module configured to:
    correct a GPS error of a satellite against a fixed GPS signal of at least one fixed GPS measuring device; and
    measure the vehicle location information with high precision;
  a CAN communication module configured to:
    connect short range communication with the OBD; and
    transceive data;
  a wireless communication module connected with the server through the wireless communication and configured to transmit, to the server, inspection data collected according to an FCA inspection of the vehicle;
  a power supply module configured to supply power of a battery or supply power by connecting to a socket of the vehicle;
  a storage module configured to store various programs and data for the FCA inspection, and store the inspection data; and
  a control module configured to:
    perform the FCA inspection when the vehicle travels;
    determine an inspection result depending on the operation of the FCA function;
    collect the inspection data based on the inspection result through the OBD; and
    record the collected inspection data in the storage module.

7. The system of claim 6, wherein the inspection data comprises operation information, an operation state, and log data of the vehicle that are recorded from a FCA inspection start time point to a FCA inspection end time point.

8. The system of claim 6, wherein the control module is configured to:
  generate a planary vehicle considering a movement direction and a dimension of the vehicle based on differential GPS coordinates of the inspection terminal;
  augment the generated planary vehicle at a same scale; and
  display the augmented planary vehicle on the road map.

9. The system of claim 6, wherein the control module is configured to:
  start the FCA inspection and collect the driving information when the vehicle location information passes an inspection SG during the travelling of the vehicle; and
  analyze the driving information and determine whether the FCA function is normal depending on the operation of the FCA function when the vehicle location information passes the normal braking gate.

10. The system of claim 9, wherein the control module is configured to:
  determine that the FCA function is normal when an obstacle detection signal and a brake operation signal depending on the operation of the FCA function are received through the driving information; and
  determine that the FCA function is abnormal when either the obstacle detection signal or the brake operation signal is not received.

11. The system of claim 9, wherein the control module is configured to:
  distinguish a brake operation signal and a brake pedal operation signal depending on the operation of the FCA function; and
  determine that braking is generated by cheating of a driver of a test when the brake pedal operation signal is received through the driving information.

12. The system of claim 9, wherein the control module is further configured to:
  recognize whether an FCA warning signal is received in a driving operation; and
  determine whether an FCA function operation warning is normally visually and audibly displayed to a driver.

13. The system of claim 9, wherein the control module is configured to:
  match a determination result of the FCA inspection and the inspection data with the VIN;
  record the matched inspection data; and
  transmit, to the server, the recorded inspection data through the wireless communication.

14. A method of inspecting Forward Collision Avoidance Assist (FCA) performance of an inspection terminal where the inspection terminal is mounted on a vehicle and configured to inspect an FCA function of the vehicle during a road driving test, the method comprising:
  a) when power is on, connecting, by an On-Board Diagnostics (OBD) mounted on the vehicle, short range wireless communication and measuring, by a differential Global Positioning System (GPS) module, vehicle location information on a road map;
  b) when the vehicle passes a virtual inspection start gate (SG) set on a road, determining that the vehicle enters an inspection section and collecting driving information from the OBD;
  c) determining whether an FCA function is operated when the vehicle passes a normal braking gate that is spaced apart from an obstacle set on the road map in a predetermined distance; and
  d) applying forced brake control information through the OBD and stopping the vehicle when the vehicle passes a forced braking gate when the FCA function is not operated.

15. The method of claim 14, wherein operation a) comprises:
  generating a planary vehicle considering a movement direction and a dimension of the vehicle based on differential GPS coordinates of the inspection terminal;
  augmenting the generated planary vehicle at a same scale; and
  displaying the augmented planary vehicle on the road map.

16. The method of claim 14, wherein operation c) comprises:
  analyzing a driving operation received when the vehicle passes the normal braking gate;
  checking whether an obstacle detection signal is received; and
  when the obstacle detection signal is not received, determining that an obstacle detection function has an error.

17. The method of claim 14, wherein the operation c) comprises:
  analyzing the driving operation received when the vehicle passes the normal braking gate;
  checking whether the obstacle detection signal is received; and when a brake operation signal depending on an operation of the FCA function is not received, determining that a brake operation is abnormal.

18. The method of claim 17, wherein the operation c) comprises:
recognizing whether an FCA warning signal is received when the brake operation signal corresponding to the operation of the FCA function is received; and
determining whether an FCA function operation warning is normally visually and audibly displayed to a driver.

19. The method of claim 14, wherein operation d) comprises:
generating forced brake control information including a forced brake operation signal, a warning signal, and an emergency light operation signal depending on a determination that an obstacle detection signal has a failure or the brake operation signal has a failure.

20. The method of claim 19, wherein the method further comprises:
matching inspection data, with a Vehicle Identification Number (VIN) of the vehicle, wherein an FCA inspection result of the obstacle detection signal failure or the brake operation signal failure is recorded in the inspection data;
recording the matched inspection data; and
transmitting, to a server, the recorded data to a server through wireless communication.

* * * * *